US00RE42059E

(19) United States
(12) Reissued Patent
Jiang

(10) Patent Number: US RE42,059 E
(45) Date of Reissued Patent: Jan. 25, 2011

(54) OVAL CENTERPOST AND COOPERATING FILTER CARTRIDGE

(75) Inventor: Zemin Jiang, Cookeville, TN (US)

(73) Assignee: Cummins Filtration IP Inc., Minneapolis, MN (US)

(21) Appl. No.: 11/789,797

(22) Filed: Apr. 25, 2007

Related U.S. Patent Documents

Reissue of:
(64) Patent No.: 6,884,349
Issued: Apr. 26, 2005
Appl. No.: 10/822,433
Filed: Apr. 12, 2004

(51) Int. Cl.
*B01D 35/147* (2006.01)
*B01D 35/157* (2006.01)

(52) U.S. Cl. ..... 210/234; 210/136; 210/457
(58) Field of Classification Search ..... 210/136, 210/234, 457
See application file for complete search history.

(56) References Cited

U.S. PATENT DOCUMENTS

| | | | | | |
|---|---|---|---|---|---|
| 2,544,244 | A | * | 3/1951 | Cecil | 210/234 |
| 3,246,766 | A | * | 4/1966 | Pall | 210/457 |
| 3,363,762 | A | | 1/1968 | Ensign | |
| 3,584,194 | A | | 6/1971 | Kautz et al. | |
| 3,800,948 | A | | 4/1974 | LaVallee | |
| 3,852,196 | A | | 12/1974 | Szpur | |
| 4,029,121 | A | | 6/1977 | Buzzi | |
| 4,272,368 | A | * | 6/1981 | Foord et al. | 210/90 |
| 4,303,514 | A | * | 12/1981 | Theorell | |
| 4,354,931 | A | | 10/1982 | Allori et al. | |
| 4,555,337 | A | | 11/1985 | Gargas | |
| 5,049,269 | A | * | 9/1991 | Shah | |
| 5,102,542 | A | | 4/1992 | Lawrence et al. | |
| 5,132,009 | A | | 7/1992 | Futa et al. | |
| 5,215,655 | A | | 6/1993 | Mittermaier | |
| 5,458,767 | A | | 10/1995 | Stone | |
| 5,643,446 | A | | 7/1997 | Clausen et al. | |
| 5,770,065 | A | | 6/1998 | Popoff et al. | |
| 5,846,417 | A | | 12/1998 | Jiang et al. | |
| 5,855,780 | A | | 1/1999 | Dye et al. | |
| 5,858,227 | A | | 1/1999 | Stone | |
| 5,922,199 | A | | 7/1999 | Hodgkins | |
| 5,958,230 | A | * | 9/1999 | Pyle et al. | 210/234 |
| 6,015,492 | A | | 1/2000 | Popoff | |
| 6,053,334 | A | | 4/2000 | Popoff et al. | |
| 6,113,781 | A | * | 9/2000 | Popoff et al. | |
| 6,171,491 | B1 | | 1/2001 | Popoff | |
| 6,248,236 | B1 | | 6/2001 | Hodgkins | |
| 6,328,883 | B1 | | 12/2001 | Jensen | |
| 6,495,042 | B1 | | 12/2002 | Knight | |
| 6,554,139 | B1 | | 4/2003 | Maxwell et al. | |
| 6,555,000 | B2 | | 4/2003 | Knight | |
| 6,884,349 | B1 | | 4/2005 | Jiang | |

* cited by examiner

*Primary Examiner*—Thomas M Lithgow
(74) *Attorney, Agent, or Firm*—Krieg DeVault LLP; J. Bruce Schelkopf, Esq.

(57) ABSTRACT

A fluid filter centerpost assembly in combination with a fluid filter cartridge for creating a "no filter-no run" design according to one embodiment of the present invention comprises an oval-shaped design for the centerpost assembly and an oval-shaped design for a seal that is positioned between the centerpost assembly and the fluid filter cartridge. The centerpost assembly includes a main body having an oval shape in lateral cross section in unitary construction with a radial flange and interior shelf. The interior shelf defines a flow opening and a movable valve ball is positioned on the interior shelf and is able to move in the direction of the flow opening due to incoming fluid pressure. The fluid filter cartridge includes a closed endcap with a blocking pin such that when the fluid filter cartridge is installed, the blocking pin is positioned to prevent the valve ball from closing off the flow opening.

24 Claims, 8 Drawing Sheets

OVAL CENTERPOST AND COOPERATING FILTER CARTRIDGE

Matter enclosed in heavy brackets [ ] appears in the original patent but forms no part of this reissue specification; matter printed in italics indicates the additions made by reissue.

*This is a reissue application of U.S. application Ser. No. 10/822,433 now U.S. Pat. No. 6,884,349.*

BACKGROUND OF THE INVENTION

The present invention relates in general to fluid filtration devices that are constructed and arranged to filter an incoming fluid prior to utilization of that fluid downstream from the filtration site. More specifically, the present invention relates to a fuel filter that includes a centerpost assembly and a replaceable filter cartridge that slides onto the centerpost assembly. One focus of the present invention is the concept of preventing fuel delivery to the engine if a "proper" filter cartridge is not installed on the centerpost assembly. In the context of the present invention, the term "proper" is used to describe a filter cartridge that is approved for use by the original equipment manufacturer. It is important that the replacement filter cartridge maintain design compatibility so that it fits properly and is properly sealed around the centerpost assembly.

In a more generic sense, the concept of "no filter-no run" means that if a filter cartridge is not installed, there is no appreciable flow of fuel to the engine. While the present invention provides this type of structure by its design of a "proper" filter cartridge, the specifics of the centerpost assembly and filter cartridge construction are important. One beneficial feature of the present invention is that its selected construction for this flow-control feature is not restrictive to the flow of fuel. If the selected construction for the flow-control feature were to introduce too much restriction, this could cause fuel system problems or inefficiencies.

Any prior art filter structures that try to address the desire for a "no filter-no run" design are considered to have various disadvantages. For example, the resulting structures are typically either too complicated, too hard to service, too costly, or have a flow-control valve construction that is too restrictive to the fuel flow. Another design disadvantage of earlier designs is that typically whatever mechanism is utilized to open a closed valve, there is a mechanical interaction which simply introduces additional design complexity and the potential for failure. The present invention provides a novel and unobvious structure to create a "no filter-no run" fuel filter structure that overcomes many of the disadvantages with earlier designs.

SUMMARY OF THE INVENTION

A fluid filter centerpost assembly in combination with a fluid filter cartridge for creating a "no filter-no run" design according to one embodiment of the present invention comprises an oval-shaped design for the centerpost assembly and an oval-shaped design for a seal that is positioned between the centerpost assembly and the fluid filter cartridge. The centerpost assembly includes a main body having an oval shape in lateral cross section in unitary construction with a radial flange and interior shelf. The interior shelf defines a flow opening and a movable valve ball is positioned on the interior shelf and able to move in the direction of the flow opening due to incoming fluid pressure. The fluid filter cartridge includes a closed endcap with a blocking pin such that when the fluid filter cartridge is installed, the blocking pin is positioned to prevent the valve ball from closing off the flow opening.

One object of the present invention is to provide an improved fluid filter centerpost assembly and fluid filter cartridge combination.

Related objects and advantages of the present invention will be apparent from the following description.

DESCRIPTION OF THE PREFERRED EMBODIMENTS

Figure 1:
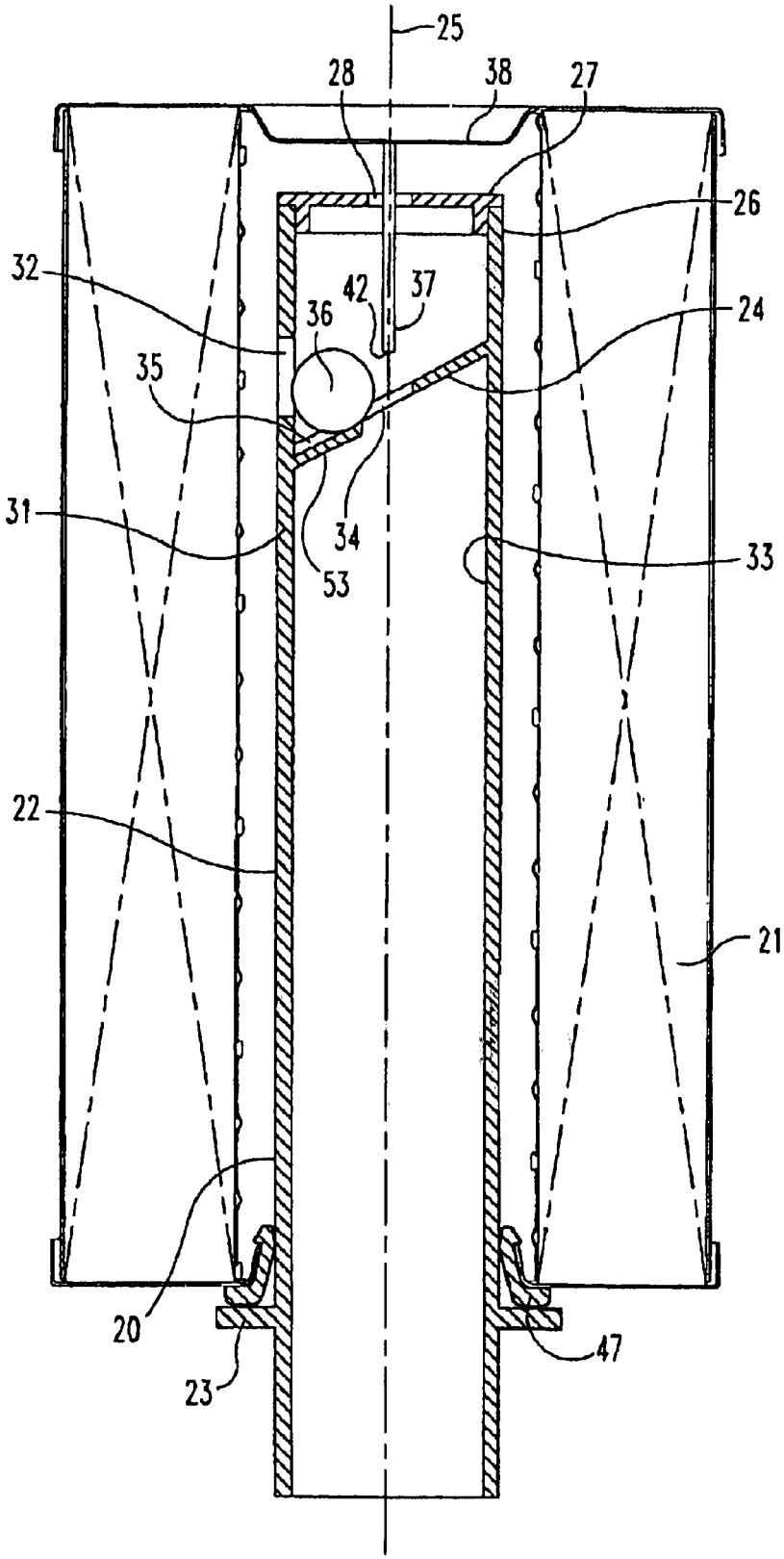
FIG. 1 is a front elevational view, in full section, of a fluid filter centerpost assembly in combination with a fluid filter cartridge according to a typical embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, portions of a fuel filter that depict the structure of the present invention are diagrammatically illustrated. These portions include, in combination, a centerpost assembly 20 and a fluid filter cartridge 21. The centerpost assembly 20 is further illustrated in FIGS. 2 and 3. The fluid filter cartridge 21 is further illustrated in FIGS. 4, 5, and 6. The centerpost assembly 20 includes a hollow main body 22 that is a unitary, molded plastic structure with an integral radial flange 23 adjacent the lower end and an integral interior shelf 24 that is inclined at an approximate 30 degree angle relative to the axial centerline 25 of main body 22. Assembled into the upper end 26 of main body 22 is a cap 27 that includes a centered clearance opening 28. The centerpost assembly 20 is completed by the addition of valve ball 36 positioned on inclined interior shelf 24.

The sidewall 31 of main body 22 defines an inlet flow opening 32 that is positioned just above the location where the interior shelf 24 is unitarily joined (i.e., molded) to the inside surface 33 of the main body 22. The interior shelf 24 defines a central flow opening 34 and a recessed track 35. The geometric center of flow opening 34 is concentric with the cylindrical main body 22 and coaxial with centerline 25. The valve ball 36 rides in the recessed track 35 and is movable across the upper surface of interior shelf 24 in response to incoming fuel flow. As would be understood, due to the inclined nature of shelf 24, valve ball 36 will naturally position itself between the interior shelf 24 and the inside surface of main body 22. The incoming fuel flow and the pressure from that flow is able to move the valve ball 36 toward the center of flow opening 34. The valve ball 36 is a molded plastic sphere and is designed to be light in weight such that virtually any fuel flow pressure is capable of moving the valve ball in the direction of flow opening 34. Further, the diameter selected for valve ball 36 is sufficiently large that it has very little distance to move to be in a position to actually close off flow opening 34. As indicated, this diameter size allows the valve ball to rest against inside surface 33 at the edge of flow opening 32 on one side and be adjacent flow opening 34 on the opposite side. If the valve ball 36 is actually allowed to move to the center of flow opening 34, the valve ball 36 is constructed and arranged to close off flow opening 34 such that fuel is unable to reach any downstream location for fuel utilization. What prevents the valve ball from closing off flow opening 34 is the presence of pin 37 which is an integral part of closed endcap 38. Pin 37 may alternatively be assembled into closed endcap 38 but, in either configuration, it is important that pin 37 extend coaxially with centerline 25 and extend in close enough proximity to flow opening 34, based upon the overall outside diameter of valve ball 36, so as to be able to prevent movement of the valve ball to a point that it could actually close off flow opening 34. It is actually the lower tip 42 of pin 37 that is positioned above but still in close proximity to flow opening 34. As such, even relatively slight movement of valve ball 36 in the direction of flow opening 34 results in abutment of the outer surface of valve ball 36 against pin 37, thereby stopping any further movement of valve ball 36. Pin 37 prevents the valve ball 36 from closing off flow opening 34 and thus this arrangement, as illustrated and described, means that as along as there is a proper fluid filter cartridge installed with pin 37 present, fuel will be permitted to flow to a downstream utilization site. However, without fluid filter cartridge 21 being installed onto centerpost assembly 20, there is nothing to prevent the closing off of flow opening 34 by valve ball 36. As described, once there is an incoming flow of fuel, the pressure of that flow readily moves valve ball 36 up the inclined shelf in the direction of flow opening 34, allowing the ball to seat and thereby close off flow opening 34. With flow opening 34 closed by valve ball 36, there is no path for the fuel to reach any downstream location.

Figure 5:
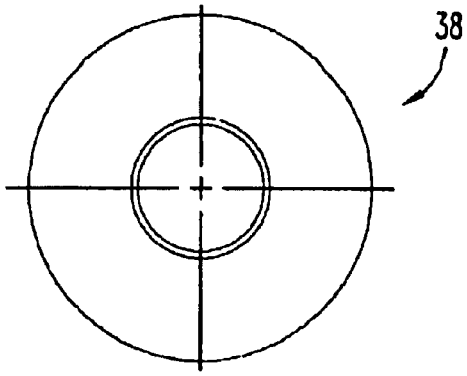
FIG. 5 is a top plan view of the FIG. 4 fluid filter cartridge.
Figure 4:
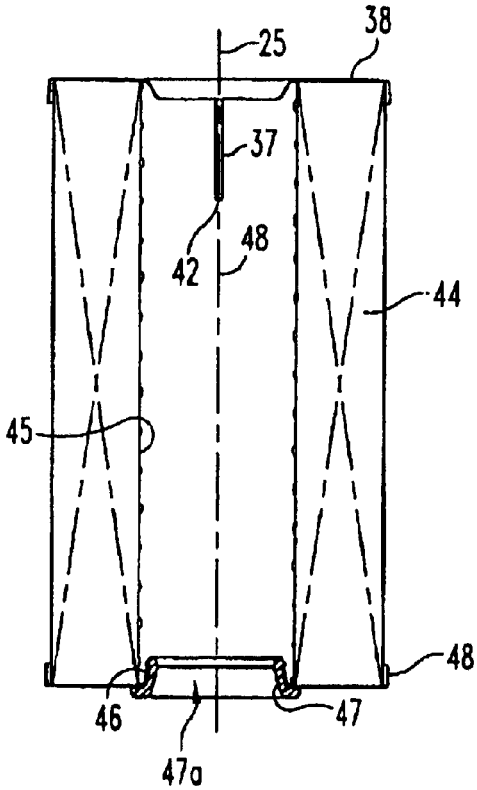
FIG. 4 is a front elevational view, in full section, of the FIG. 1 fluid filter cartridge.
Figure 6:
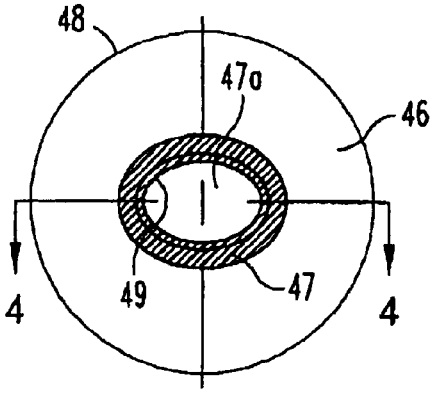
FIG. 6 is a bottom plan view of the FIG. 4 fluid filter cartridge with an oval seal installed.

With reference to FIGS. 4, 5, and 6, filter cartridge 21 includes a filtering media 44, centertube 45, the closed endcap 38, an open endcap 46, and an elastomeric seal 47 that is preassembled onto open endcap 36. The filtering media 44 and centertube 45 are each cylindrical and preassembled together such that the centertube 45 provides structural integrity and support to prevent filtering media collapse. The open endcap 46 is bonded to the lower end of the filtering media 44 and centertube 45 assembly. The circular, closed endcap 38 is bonded to the upper end of the filtering media 44 and centertube 45 assembly. Pin 37 is centered in endcap 38 such that all of these assembled components are concentric and coaxial. The longitudinal axis 48 of pin 37 is coaxial with axial centerline 25 and with the center of flow hole 34.

Figure 8:
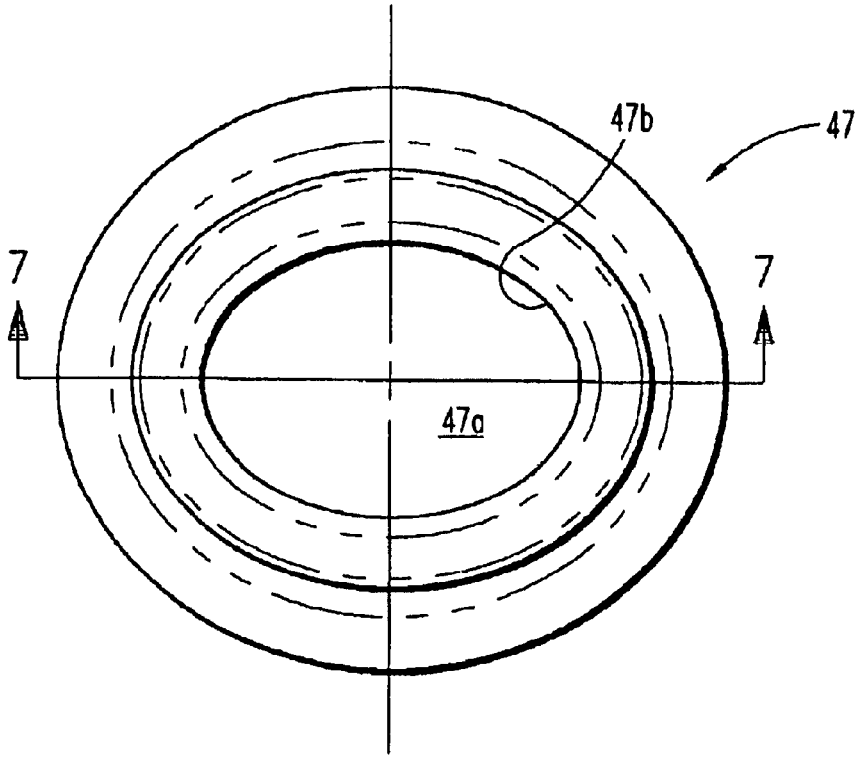
FIG. 8 is a top plan view of the FIG. 7 seal.
Figure 7:
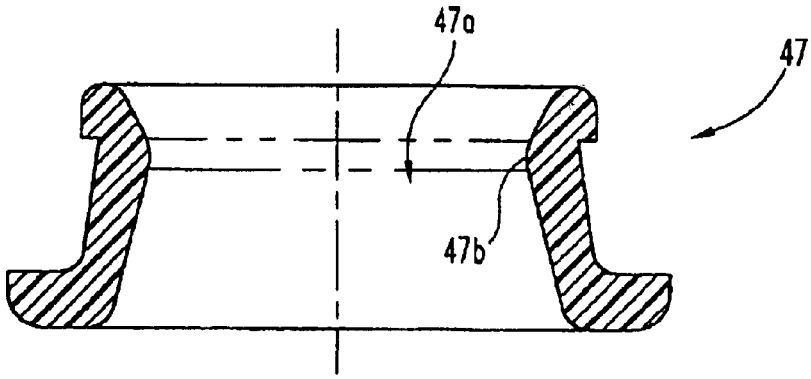
FIG. 7 is a front elevational view, in full section, of the seal illustrated in FIG. 4.
Figure 9:
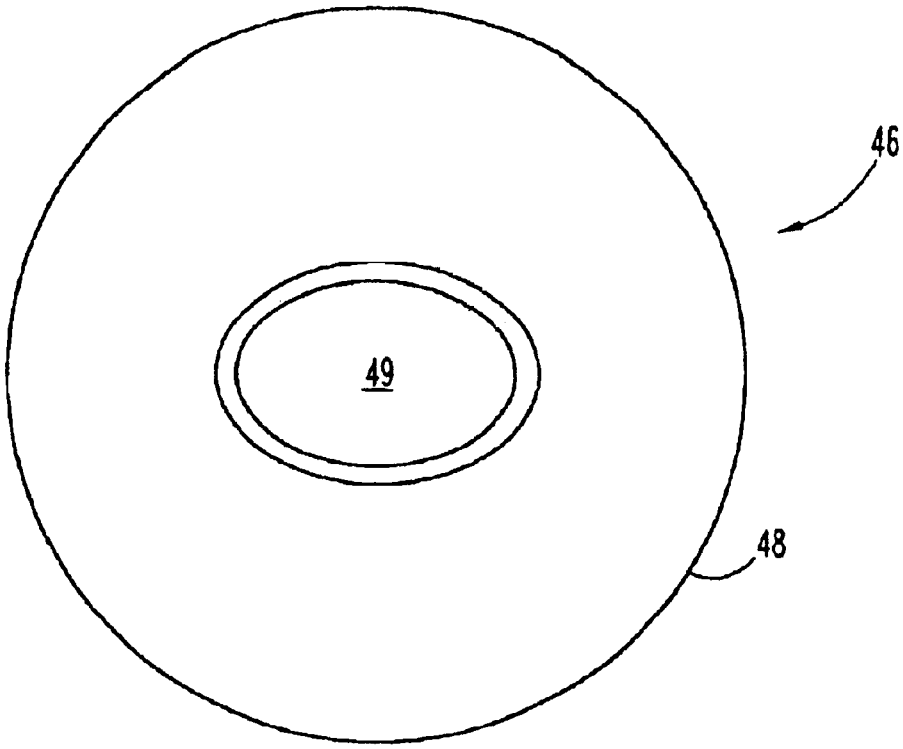
FIG. 9 is a bottom plan view of an open endcap comprising a portion of the FIG. 4 fluid filter cartridge.

While the filtering media 44, centertube 45, and endcap 38 are circular or cylindrical in overall shape, it is important to note that elastomeric seal 47 is oval in shape, including an oval interior opening 47a. This in turn results in the open endcap 46 having a circular outside diameter (outer edge 48) and an oval or elliptical opening 49 centered on the axial centerline 25. The point of intersection of the major and minor axes of the oval shape coincides with axial centerline 25. The details of elastomeric seal 47 are illustrated in FIGS. 7 and 8, including its oval shape. The oval shape of opening 49 and its centered position in endcap 46 are illustrated in FIG. 9.

Figure 2:
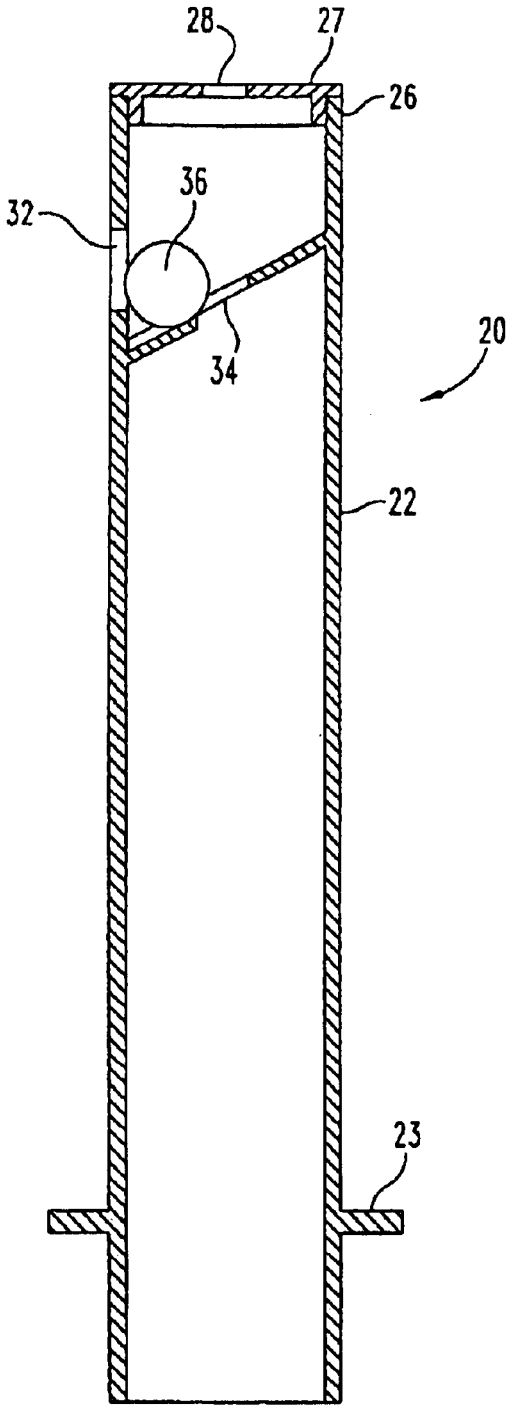
FIG. 2 is a front elevational view, in full section, of the FIG. 1 centerpost assembly.
Figure 3:
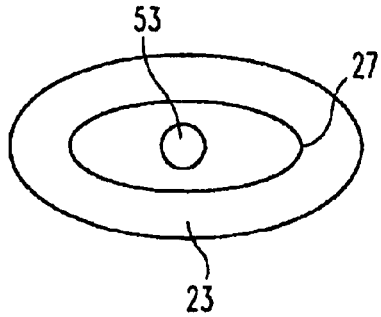
FIG. 3 is a top plan view of the FIG. 2 centerpost assembly.

With continued reference to FIGS. 2 and 3, the details of centerpost assembly 20 are illustrated. As will be seen from the FIG. 3 illustration, the centerpost assembly 20 and in particular the main body 22 has an oval shape in lateral cross section. As has been noted, the radial flange 23 also has an oval shape, as does closing cap 27 and interior shelf 24. Closing cap 27 and its matching oval shape are designed to fit into the oval upper end 26. Circular opening 28 in cap 27 is coaxially centered and is axially aligned with pin 37 and with flow hole 34. The assembly of cap 27 into end 26 can be by means of an interference press fit or by the use of a suitable adhesive or by a spin weld.

As illustrated in FIG. 1, as fluid filter cartridge 21 slides down onto centerpost assembly 20, oval seal 47 slides down oval main body 22 until there is abutment of seal 47 against the upper surface of radial flange 23. The oval opening 47a is sized and shaped to generally match the size and shape of body 22, but with moderate compression of inner rib 47b. It should be understood that support of oval seal 47 by radial flange 23 is facilitated and made more efficient by creating radial flange 23 with a corresponding oval shape and with sufficient size to fully receive seal 47. In order to establish a sealed interface around the oval main body 22, it is necessary to design and fabricate seal 47 with a properly sized oval opening 47a that experiences some moderate compression for a leak-free radial seal against body 22. The preassembly of the seal 47 onto open endcap 46 requires that the opening 49 have a corresponding oval shape. By applying a moderate force on filter cartridge 21 for its abutment against radial flange 23 and then maintaining that moderate force, an oval compression seal can also be established between fluid filter cartridge 21 and radial flange 23.

While the cooperating and supporting structures have been described in the context of FIGS. 1–9, an important focus of the present invention is the desire to create a fuel filter wherein there is a no filter cartridge-no run arrangement. This means that unless there is a "proper" filter cartridge installed onto the centerpost assembly 20, it is not possible to have fuel delivered to any downstream location of utilization. While a few drops of fuel might flow through, the point to be recognized is that "no run" means insufficient fuel to perform any typical or normal engine functions. Critical to achieving this no filter cartridge-no run capability is the design of the inclined interior shelf 24, the use of valve ball 36, and the presence of pin 37. Importantly, this interior shelf 24 has an oval shape, as illustrated by the top plan view of FIG. 10.

Figure 10:
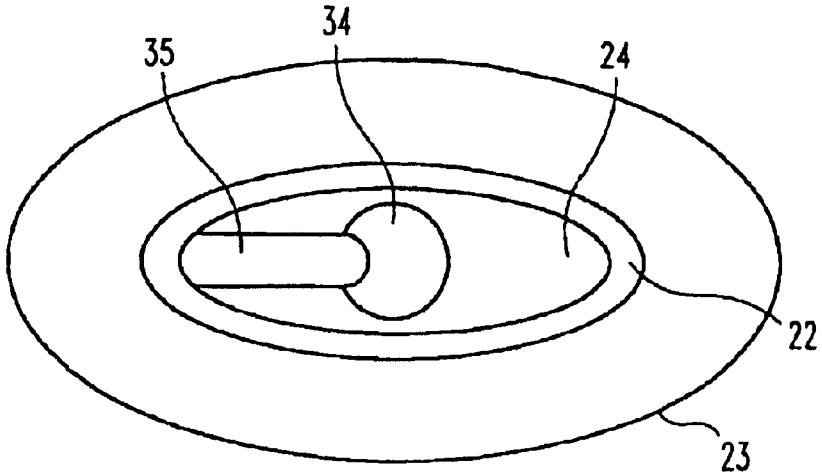
FIG. 10 is a top plan view of an interior shelf portion of the FIG. 2 centerpost assembly.
Figure 11:
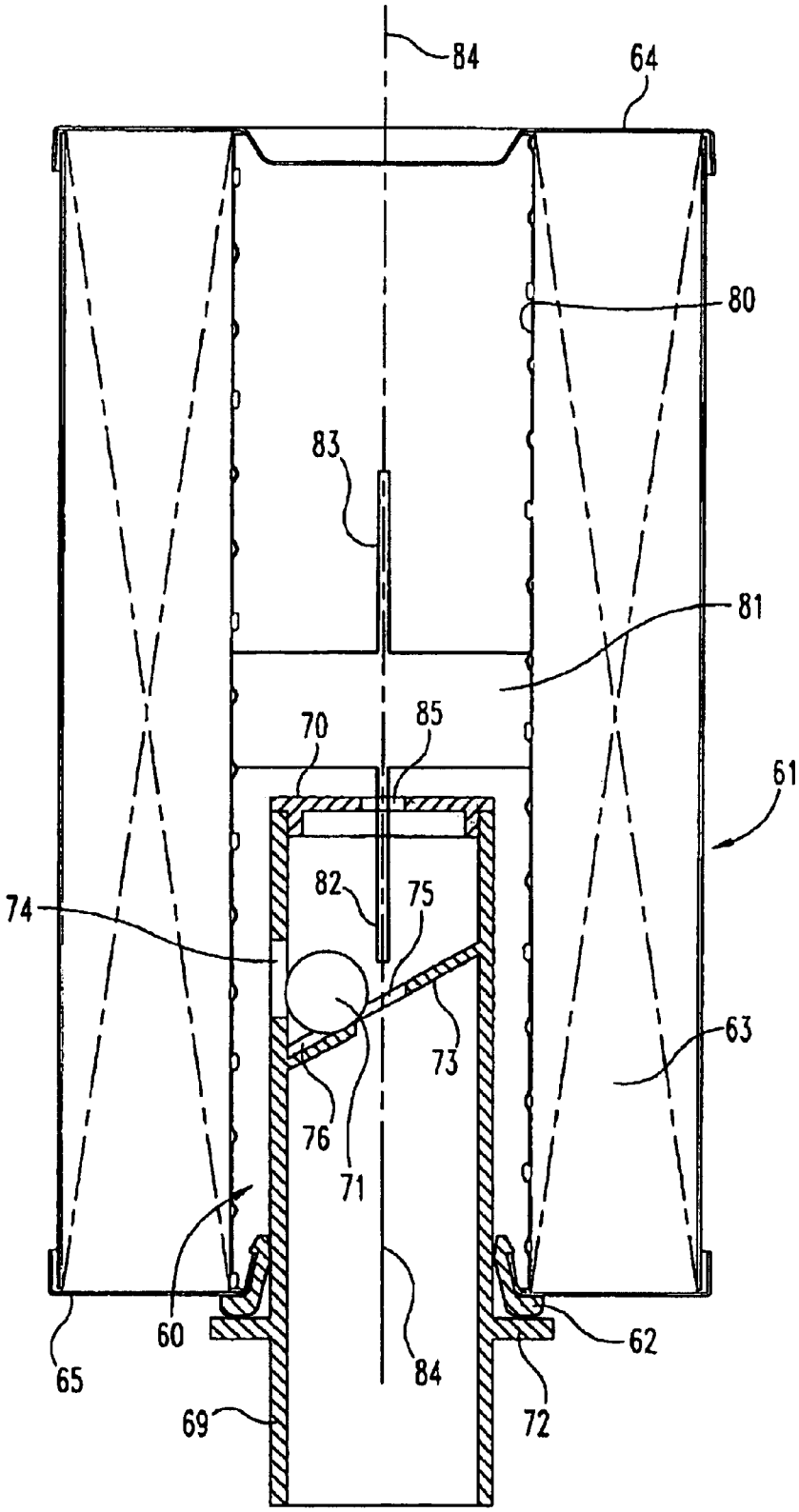
FIG. 11 is a front elevational view, in full section, of a fluid filter centerpost assembly in combination with a fluid filter cartridge according to another embodiment of the present invention.

Referring to FIGS. 1 and 10, it will be seen, as described, that main body 22 has an oval or elliptical shape as does radial flange 23. The interior spaced defined by main body 22 is also oval or elliptical in shape and is closed off completely by shelf 24. The only opening or passageway for the flow of fuel is by way of flow opening 34. Track 35 is shaped as a narrow channel that extends from flow opening 34 to the inside surface 33 of main body 22. A lower shelf portion 53 provides added material thickness for incorporating track 35 without it breaking through such that track 35 would create another flow path. Closing off track 35 ensures that the only flow path for fuel is through flow opening 34. Notwithstanding the various shapes, openings, walls and curvatures, all of main body 22, including interior shelf 24 and radial flange 23, can be molded as a unitary component. This includes track 35 and flow opening 24, as illustrated and described.

Figure 12:
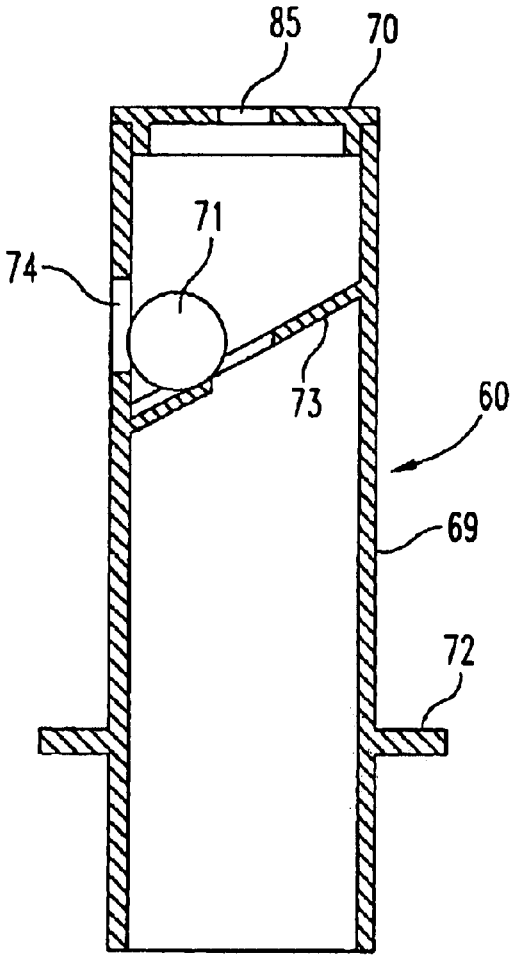
FIG. 12 is a front elevational view, in full section, of the FIG. 11 centerpost assembly.
Figure 13:
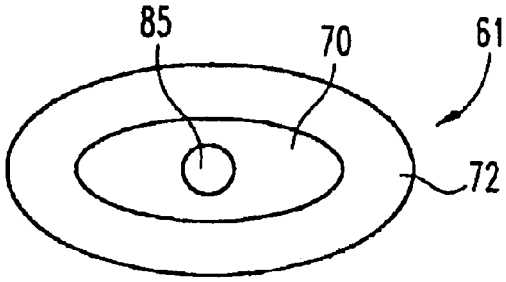
FIG. 13 is a top plan view of the FIG. 12 centerpost assembly.
Figure 15:
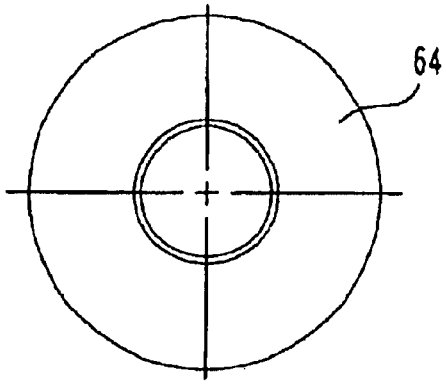
FIG. 15 is a top plan view of the FIG. 14 fluid filter cartridge.
Figure 14:
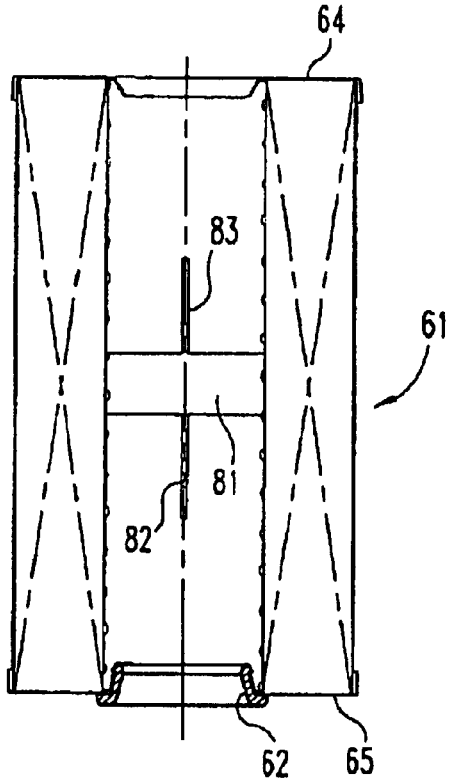
FIG. 14 is a front elevational view, in full section, of the FIG. 11 fluid filter cartridge.
Figure 16:
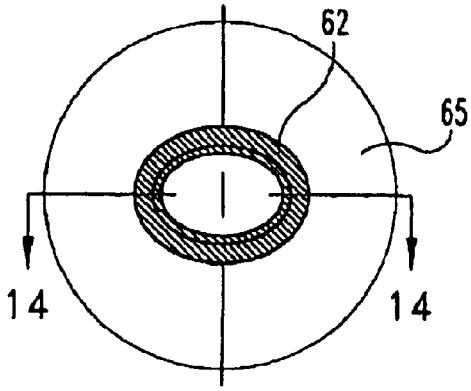
FIG. 16 is a bottom plan view of the FIG. 14 fluid filter cartridge including an oval seal.

Referring now to FIG. 1, another embodiment of the present invention is illustrated. The illustrated assembly includes a centerpost assembly 60, fluid filter cartridge 61 and, as part of cartridge 61, an oval elastomeric seal 62. Assembled to one end of filtering media 63 is a closed endcap 64 and assembled to the opposite end of the filtering media is an open endcap 65 (see FIGS. 14–16). The centerpost assembly 60 includes a main body 69, closing cap 70, and valve ball 71. The construction and assembly of centerpost assembly 60 is intended to be substantially the same as the construction and assembly of centerpost assembly 20. The only important difference is that centerpost assembly 60 is shortened in an axial direction as compared to the overall length of centerpost assembly 20. Otherwise, centerpost assembly 60 and centerpost assembly 20 are virtually the same, they are intended to function in the same way and have the same overall design philosophy, including the use of an oval radial flange 72, an inclined interior shelf 73, also oval in shape, flow opening 74, flow opening 75, and track 76. The details of centerpost assembly 60 are illustrated in FIG. 12. The oval shape of centerpost assembly 60, focusing primarily on main body 69 and the corresponding portions including flange 72 and closing cap 70, are illustrated in FIG. 13. As indicated, the overall construction and functioning of centerpost assembly 60 is the same as centerpost assembly 20, including function, way, and result. This also includes a virtually identical utilization and philosophy including positioning and movement for valve ball 71.

There are fuel filter applications wherein the centerpost or centerpost assembly must be shortened and this alternative design is represented by centerpost assembly 60. However, the filter cartridge 61 must be modified to accept and cooperate with the shorter centerpost assembly. The filter cartridge includes a centertube 80 and molded as a unitary portion of centertube 80 is a dual-pin plug 81. Plug 81 is centered axially between opposite ends of filtering medial 63 and includes pin 82 extending in the direction of open endcap 65 and oppositely thereto pin 83 extending in the direction of closed endcap 64. Pins 82 and 83 are coaxial with longitudinal centerline 84. This longitudinal centerline 84 is coaxial with the longitudinal axes of filtering media 63, centertube 80, and filter cartridge 61. Consistent with the design and construction of centerpost assembly 20 and fluid filter cartridge 21, pins 82 and 83 are centered on the circular center of opening 85 defined by closing cap 70 and flow opening 75 defined by interior shelf 73.

The use of plug 81 allows pin 82 to function as described in connection with pin 37, without having to extend the increased length from closed endcap 64. Additionally, by using two pins oppositely arranged and centered axially, it does not matter which end of filtering medial 63 receives the closed endcap 64 and which end of the filtering media receives the open endcap 65 when creating the fluid filter cartridge 61. Either order of endcaps can be used and whichever end receives the open endcap, there will be a properly positioned and aligned pin for the centerpost assembly 60 when the fluid filter cartridge slides down over the oval centerpost assembly 60. Plug 81 is a molded plastic portion of centertube 80 and while either endcap can be used, the unitary centertube 80 can be assembled in either direction into filtering media 61.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In combination:

a fluid filter centerpost assembly comprising:

a main body defining a first flow opening and an open interior and having an oval shape in lateral cross section;

an oval-shaped radial flange;

an oval-shaped interior shelf defining a second flow opening and being positioned on an incline in said open interior;

a closing cap assembled into said main body; and a movable valve ball positioned on said interior shelf; and a fluid filter cartridge received by said fluid filter centerpost assembly comprising:

a filtering media;

a closed endcap assembled to one end of said filtering media, said closed endcap including a blocking pin, said blocking pin being constructed and arranged for limiting any movement of said movable valve ball in the direction of said second flow opening;

an open endcap assembled to another end of said filtering media; and an oval-shaped seal received by said open endcap and being positioned around said main body and resting on said radial flange.

2. The combination of claim 1 wherein said main body is a unitary, molded plastic structure.

3. The combination of claim 2 wherein said interior shelf defines a track for guiding any movement of said valve ball.

4. In combination:

a fluid filter centerpost assembly comprising:

a main body defining a first flow opening and an open interior and having an oval shape in lateral cross section;

an oval-shaped radial flange;

an oval-shaped interior shelf defining a second flow opening and being positioned on an incline in said open interior;

a closing cap assembled into said main body; and a movable valve ball positioned on said interior shelf; and a fluid filter cartridge received by said fluid filter centerpost assembly comprising:

a filtering media;

a first endcap assembled to one end of said filtering media;

a second endcap assembled to another end of said filtering media;

an oval-shaped seal received by said second endcap and being positioned around said main body and resting on said radial flange; and blocking means for limiting any movement of said movable valve ball in the direction of said second flow opening.

5. The combination of claim 4 wherein said main body is a unitary, molded plastic structure.

6. The combination of claim 5 wherein said interior shelf defines a track for guiding any movement of said valve ball.

7. The combination of claim 4 wherein said blocking means includes a protrusion extending from said first endcap in the direction of said second flow opening.

8. The combination of claim 4 wherein said filtering media is shaped with a hollow interior and said fluid filter cartridge further includes a centertube positioned within said hollow interior.

9. The combination of claim 8 wherein said blocking means includes a structural member positioned within said centertube and a protrusion extending from said structural member in the direction of said second flow opening.

10. In combination:

a fluid filter centerpost assembly comprising:

a main body defining a first flow opening and an open interior and having an oval shape in lateral cross section;

an oval-shaped radial flange;

an oval-shaped interior shelf defining a second flow opening and being positioned on an incline in said open interior;

a closing cap assembled into said main body; and a movable valve ball positioned on said interior shelf; and a fluid filter cartridge received by said fluid filter centerpost assembly comprising:

a filtering media formed into a shape to define a hollow interior;

a first endcap assembled to one end of said filtering media;

a second endcap assembled to another end of said filtering media;

an oval-shaped seal received by said second endcap and being positioned around said main body and resting on said radial flange; and a support plug positioned in said hollow interior, said support plug including a blocking pin extending in the direction of said second flow opening for limiting any movement of said movable valve ball in the direction of said second flow opening.

11. The combination of claim 10 wherein said main body is a unitary, molded plastic structure.

12. The combination of claim 11 wherein said interior shelf defines a track for guiding any movement of said valve ball.

13. The combination of claim 12 wherein said support plug includes an alternate blocking pin extending in a direction opposite to the direction of said blocking pin.

14. The combination of claim 13 wherein said support plug is constructed and arranged to be assembled into said hollow interior in either of two orientations wherein one orientation has said blocking pin extending toward said second flow opening and wherein the other orientation has said alternate blocking pin extending toward said second flow opening.

15. The combination of claim 10 wherein said support plug includes an alternate blocking pin extending in a direction opposite to the direction of said blocking pin.

16. The combination of claim 15 wherein said support plug is constructed and arranged to be assembled into said hollow interior in either of two orientations wherein one orientation has said blocking pin extending toward said second flow opening and wherein the other orientation has said alternate blocking pin extending toward said second flow opening.

*17. An apparatus comprising:*

*a fuel filter cartridge including:*

*a filtering media;*

*a hollow interior;*

*a first endcap coupled to one end of said filtering media;*

*a support plug positioned in said hollow interior;*

*a blocking pin extending from said support plug into said hollow interior in a direction toward said first endcap; and*

*a second endcap coupled to another end of said filtering media and a second blocking pin extending from said support plug into said hollow interior in a direction toward said second endcap.*

*18. The apparatus of claim 17 wherein the support plug is centered axially between a first end of the filtering media and a second end of the filtering media and occupies a portion of the hollow interior effective to accommodate a fluid flow though the hollow interior past the support plug.*

*19. The apparatus of claim 17 further comprising a seal received by one of said first endcap and said second endcap, said seal having an oval shaped aperture leading to said hollow interior.*

*20. The apparatus of claim 17 further comprising a filter centerpost assembly; wherein said centerpost is received by said hollow interior.*

*21. A system comprising:*

*a fuel filter centerpost including an internal flow passage and a sidewall having an inlet flow opening leading to said flow passage;*

*an inclined shelf positioned within said flow passage and having flow opening defined therein; and*

*a ball positioned adjacent said inclined shelf and being moveable by a fluid flow from a position not obstructing said flow opening to a position obstructing said flow opening.*

*22. The system of claim 21 wherein said centerpost has an oval shape in lateral cross section.*

*23. The system of claim 21 wherein said ball is positioned in a recessed track provided in said shelf.*

*24. The system of claim 21 further comprising a filter element including a blocking pin, said filter element being coupled with said centerpost such that said blocking pin prevents said ball from moving to said position obstructing said flow opening.*

* * * * *